United States Patent
Naono

(10) Patent No.: US 8,649,079 B2
(45) Date of Patent: Feb. 11, 2014

(54) MIRROR DRIVING DEVICE AND MIRROR DRIVING METHOD

(75) Inventor: Takayuki Naono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 135 days.

(21) Appl. No.: 13/433,338

(22) Filed: Mar. 29, 2012

(65) Prior Publication Data
US 2012/0250127 A1  Oct. 4, 2012

(30) Foreign Application Priority Data
Mar. 30, 2011 (JP) ................. 2011-074429

(51) Int. Cl.
*G02B 26/08* (2006.01)
(52) U.S. Cl.
USPC ............... 359/199.4; 359/200.8; 359/224.1
(58) Field of Classification Search
USPC .......... 359/198.1, 199.1, 199.4, 200.8, 221.2, 359/224.1–224.2; 310/311, 321
See application file for complete search history.

(56) References Cited

U.S. PATENT DOCUMENTS

2007/0269199 A1* 11/2007 Mori et al. ................ 396/322
2008/0225363 A1    9/2008 Saitoh et al.

FOREIGN PATENT DOCUMENTS

JP    4092283 B2    5/2008
JP    2008-257226 A    10/2008

* cited by examiner

*Primary Examiner* — James Phan
(74) *Attorney, Agent, or Firm* — Birch, Stewart, Kolasch & Birch, LLP

(57) ABSTRACT

A mirror driving device of an aspect can include: a mirror part; a pair of inner actuator parts; a pair of outer actuator parts; fixing and supporting parts; an inner actuator driving voltage supply part; and an outer actuator driving voltage supply part. A driving voltage with a frequency inducing oscillation of the mirror part in a rotating direction of the mirror part associated with resonance drive of the corresponding actuator parts can be supplied from one driving voltage supply part of the inner actuator driving voltage supply part and the outer actuator driving voltage supply part to the inner actuator parts or the outer actuator parts corresponding to the one driving voltage supply part. Simultaneously with the resonance drive, a driving voltage for inclining the mirror part without exciting resonance drive can be supplied from the other driving voltage supply part to corresponding actuator parts.

12 Claims, 11 Drawing Sheets

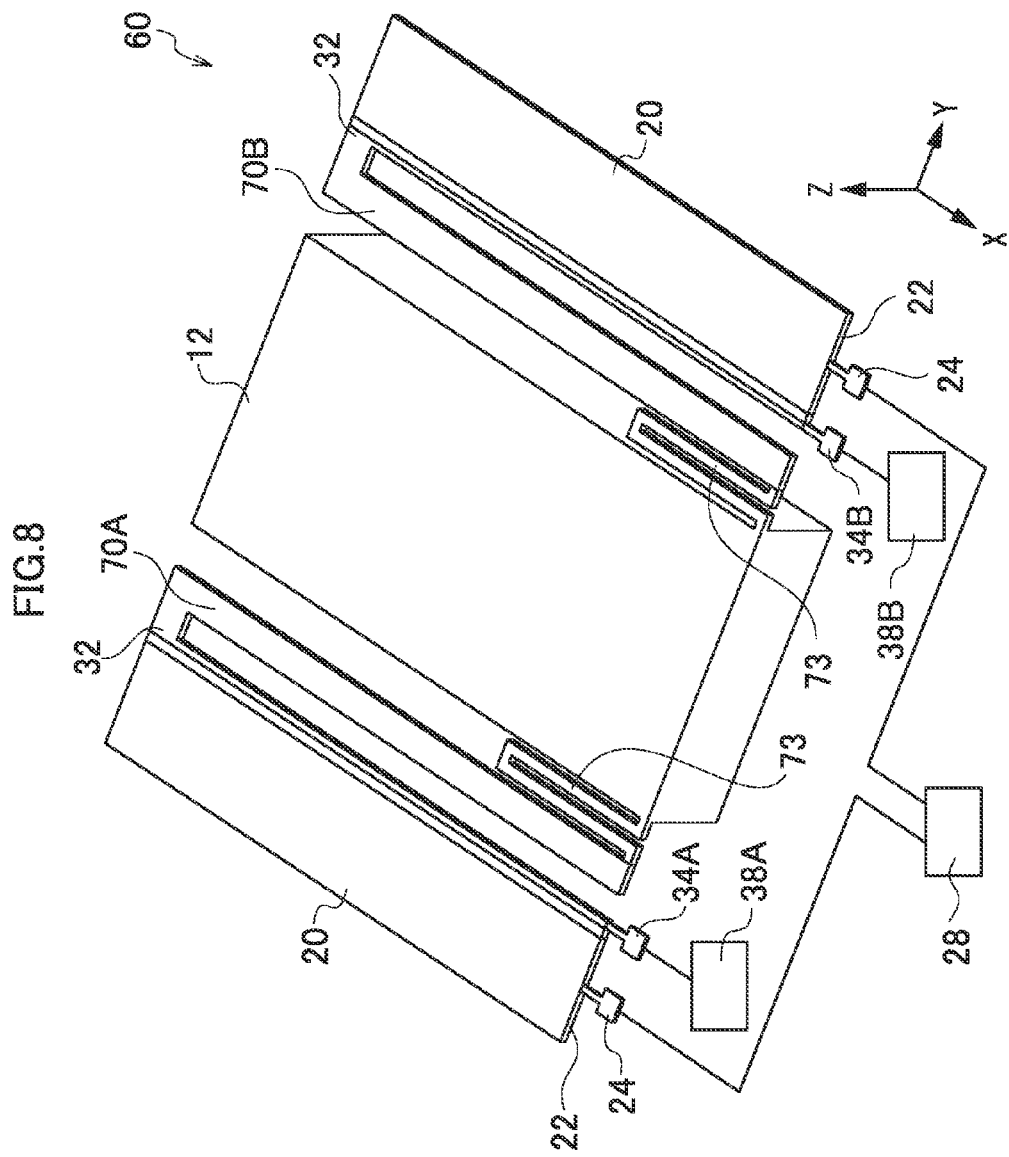

MIRROR DRIVING DEVICE AND MIRROR DRIVING METHOD

BACKGROUND OF THE INVENTION

1. Field of the Invention

The presently disclosed subject matter relates to a mirror driving device and a mirror driving method, and in particular to a structure of a mirror device suitable for an optical deflector used in optical scan and a drive control technique of the mirror device.

2. Description of the Related Art

Examples of a deflector configured to scan a light beam in an optical scanning device include a polygon mirror and a galvanometer mirror. However, configurations of the examples have a structure where a mirror is rotated by an electromagnetic motor, which results in constraint of size reduction. Further, in order to obtain an image with a further high resolution or realize high-speed printing, rotation of the mirror must be made further fast, which results in a problem of durability of a bearing, or heat generation or noises due to draft loss.

Recently, an oscillation mirror (MEMS (Micro Electro Mechanical System) scanner) has been proposed (Japanese Patent Application Laid-Open No. 2008-257226 and Japanese Patent No. 4092283). The oscillation mirror utilizes a silicon micromachining (MEMS) and is obtained by integrally forming a fine mirror and a beam configured to support the fine mirror on a silicon substrate. Since the oscillation mirror is configured to be oscillated reciprocally utilizing resonance, the oscillation mirror can reduce nose in spite of a high-speed operation. Further, since driving force for rotating a mirror part is small, power consumption can be suppressed. Further, the MEMS scanner has such a merit that a movable part and a driving part can be integrally manufactured from a semiconductor substrate using a MEMS processing technique.

Examples of a driving system for the MEMS scanner include a driving system utilizing a deformation of a piezoelectric body. This driving system has such a merit that torque is large and a voltage is low. Japanese Patent Application Laid-Open No. 2008-257226 discloses a structure where a mirror part is connected to a piezoelectric unimorph cantilever via a twisting hinge. By driving this piezoelectric unimorph cantilever in a direction of twisting a torsion bar, the mirror part is rotationally driven, thereby realizing one-dimensional scan. Here, by causing frequency of a driving source to coincide with a resonance frequency of a movable mirror, a large mirror rotation angle can be obtained with a lower voltage.

A part for performing resonance scan with a relatively high frequency can be incorporated into a movable frame, and the movable frame can be connected to another actuator via a twisting hinge. Thus, two-dimensional drive can be performed by rotationally driving the movable frame about an axis perpendicular to a rotational axis of the resonance scan. This technique is applied to a display or the like (Japanese Patent No. 4092283).

SUMMARY OF THE INVENTION

In this specification, for convenience shake of explanation, scan caused by reciprocating oscillation utilizing resonance may be called "A scan", while movement (scan) to a direction perpendicular to the resonance scan may be called "B scan" (see FIG. 12). Further, by causing the rotation axis of the above B scan to coincide with the rotation axis of the A scan, a scan center of the A scan can be moved to a targeted place (an arbitrary position). The movement for moving the scan center of the A scan to the targeted place in this manner may be called "C scan" (see FIG. 13).

In the Japanese Patent No. 4092283, an actuator for performing the C scan for movement of scan center or the B scan in two-dimensional scan and another actuator for performing a high-speed scan are provided separately from each other. In that case, it becomes necessary to provide a complicated structure using a movable frame or the like. Therefore, a manufacturing process is complicated, which results in deterioration of yield.

In the configuration for one-dimensional scan as described in the Japanese Patent Application Laid-Open No. 2008-257226, it is made possible to perform the two-dimensional scan and the scan center movement by superimposing an offset bias (DC voltage) to the same actuator in addition to an alternating-current (AC) voltage for resonance excitation. However, since a high voltage is applied to a piezoelectric film upon performing the movement of the scan center or the two-dimensional scan with a superimposed voltage of DC-AC obtained by superimposing the voltage for resonance excitation on the offset bias, durability of the piezoelectric film is significantly degraded. Further, this may cause a depolarization of the piezoelectric film. Especially, when a piezoelectric body is thinned down to a thickness of about 1 to 4 μm in order to make a displacement of the piezoelectric film larger, electric field generated becomes larger. Thus, the thin piezoelectric film may be more likely to cause the above degradation and/or depolarization of the piezoelectric film.

The presently disclosed subject matter has been made in view of these circumstances. The presently disclosed subject matter can provide a mirror driving device which can be manufactured without a complicated movable frame structure and which is excellent in durability, and a mirror driving method concerning the mirror driving device.

In view of the above, a mirror driving device of an aspect of the presently disclosed subject matter can include: a mirror part; a pair of inner actuator parts; a pair of outer actuator parts; fixing and supporting parts; an inner actuator driving voltage supply part; and an outer actuator driving voltage supply part. The pair of inner actuator parts can be arranged on both sides of the mirror part so as to sandwich the mirror part, and coupled to the mirror part. The pair of inner actuator parts can perform bending displacement due to deformation of a piezoelectric body. The pair of outer actuator parts can be arranged on the both sides of the mirror part, arranged at positions farther from the mirror part than the pair of inner actuator parts, and coupled to the inner actuator parts. The pair of outer actuator parts can perform bending displacement due to the deformation of the piezoelectric body. The fixing and supporting parts can be coupled to end portions of the outer actuator parts other than coupling parts of the outer actuator parts with the inner actuator parts and support the outer actuator parts utilizing the end portions as fixing parts. The inner actuator driving voltage supply part can supply driving voltage to the inner actuator parts to actuate the inner actuator parts. The outer actuator driving voltage supply part can supply driving voltage to the outer actuator parts to actuate the outer actuator parts. One ends of the inner actuator parts can be coupled to the mirror part, while the other ends of the inner actuator parts can be coupled to the outer actuator parts. A driving voltage with a frequency inducing oscillation of the mirror part in a rotating direction of the mirror part associated with resonance drive of the corresponding actuator parts can be supplied from one driving voltage supply part of the inner actuator driving voltage supply part and the outer actuator driving voltage supply part to the inner actuator parts or the outer actuator parts corresponding to the one driving voltage supply part. Simultaneously with the resonance drive, a driving voltage for inclining the mirror part without exciting resonance drive can be supplied from the other driving voltage supply part to corresponding actuator parts different from the actuator parts performing the resonance drive of the inner actuator parts and the outer actuator parts.

The other aspects of the presently disclosed subject matter can be made clear from the descriptions of the specification and the drawings.

According to the presently disclosed subject matter, it is possible to perform a mirror drive composed of a movement of the mirror part caused by resonance drive (a mirror drive for A scan) and another movement of the mirror part caused by non-resonance drive (a mirror drive for B scan or C scan) which are combined with each other, by a simple structure coupling the inner actuator parts and the outer actuator parts so as to sandwich the mirror part from both sides of the mirror part.

Further, according to the presently disclosed subject matter, actuator parts for resonance drive and actuator parts for non-resonance drive are separately provided. And, driving voltages are individually supplied to the actuator parts for resonance drive and the actuator parts for non-resonance drive from driving voltage supply parts different from each other. Thus, driving voltages applied to the respective actuator parts can be suppressed to be lower than a configuration where the resonance drive voltage and the offset bias are superimposed on the same actuators. And, durability of the actuator parts is improved.

BRIEF DESCRIPTION OF THE DRAWINGS

FIG. 8 is a schematic diagram of an MEMS scanner device and a driving control device for the MEMS scanner device according to a second embodiment of the presently disclosed subject matter;

DETAILED DESCRIPTION OF EXEMPLARY EMBODIMENTS

Exemplary embodiments of the presently disclosed subject matter will be described below with reference to the accompanying drawings.

First Embodiment

Figure 1:
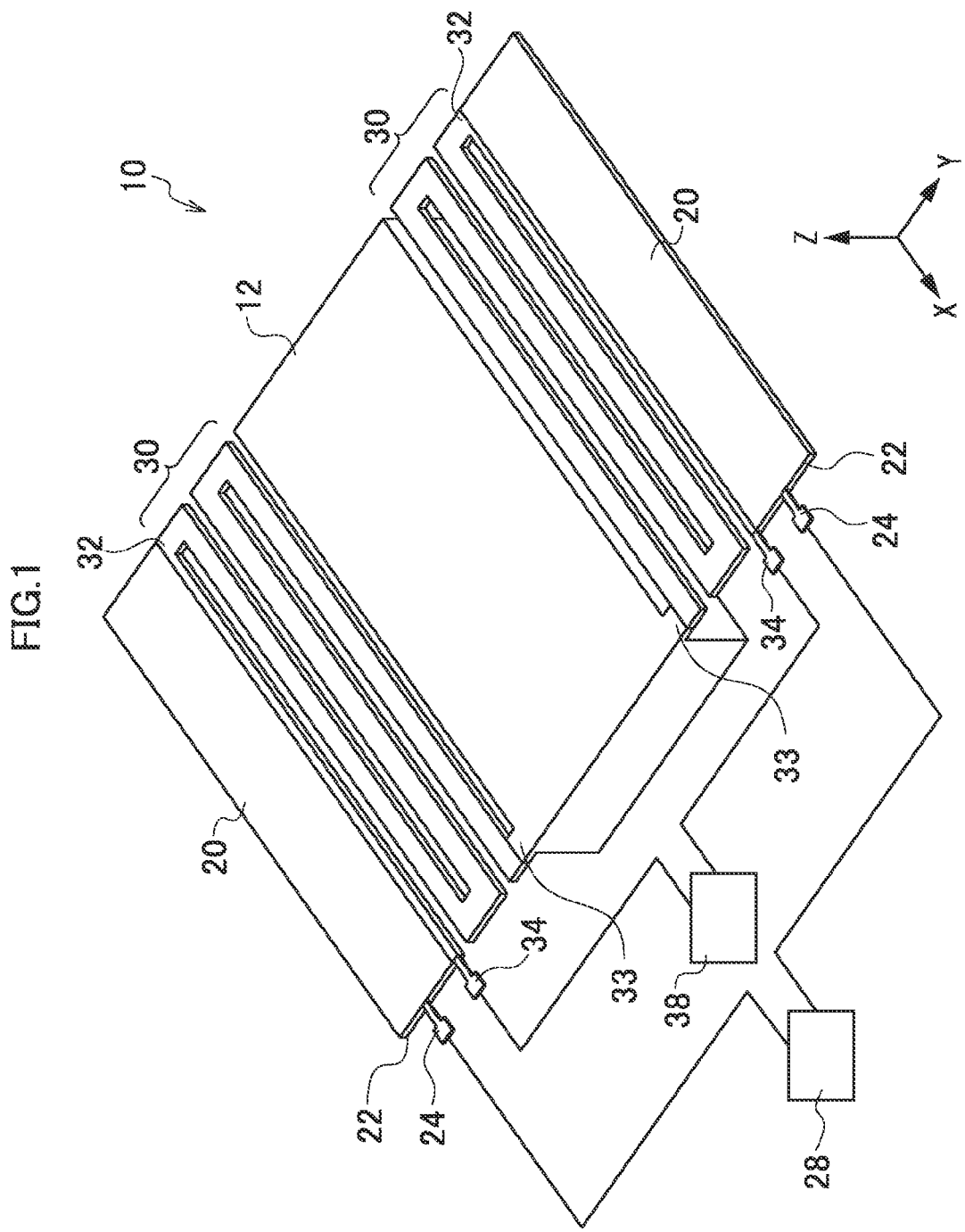
FIG. 1 is a schematic diagram of an MEMS scanner device and a driving control device for the MEMS scanner device according to a first embodiment of the presently disclosed subject matter.

FIG. 1 is a schematic diagram of an MEMS scanner device and a driving control device for the MEMS scanner device according to a first embodiment of the presently disclosed subject matter. As illustrated in FIG. 1, an MEMS scanner device 10 includes a mirror part 12, first actuators (actuators for resonance) 20 adapted to perform resonance drive of the mirror part 12, and second actuators (actuators for center movement) 30 adapted to perform non-resonance drive for moving the center of scan (resonance-scan) caused by the resonance drive. The first actuators 20 correspond to "outer actuator parts", while the second actuator 30 correspond to "inner actuator parts".

In this embodiment, the mirror part 12 includes a substantially rectangular reflecting face. A longer side direction of the reflecting face at a non-driving time is defined as X direction, a shorter side direction perpendicular to the longer side direction is defined as Y direction, and a direction perpendicular to an X-Y plane is defined as Z direction. In implementation of the presently disclosed subject matter, the shape of the mirror part is not limited to this embodiment. The shape of the mirror part is not limited to the rectangular shape but may be various shapes such as a square shape, a polygonal shape, a circular shape, or an elliptical shape. A metal thin film made of Au (gold), Al (aluminum) or the like is formed on an upper face of the mirror part 12 in order to enhance a reflectance to incident light. A material for mirror coating and a thickness of the film are not limited to this embodiment. Various mirror materials (high reflectance materials) can be used to make the film.

In the MEMS scanner device 10 of this embodiment, a pair of second actuators 30 are arranged so as to sandwich the mirror part 12 having a reflecting face oriented in the Z direction from both sides in the Y direction, and a pair of first actuators 20 are arranged further outside the second actuators 30. Each of the first actuators 20 and the second actuators 30 is an actuator having a piezoelectric unimorph cantilever structure (see FIG. 2). Each of the first actuators 20 and the second actuators 30 perform bending displacement according to deformation of a piezoelectric body. The first actuators 20 are fixed to a supporting member (not illustrated in FIG. 1; reference sign 50 in FIG. 3) at fixing parts 22. The fixing parts 22 are one end portions of the first actuators 20 in the X direction. End portions of the first actuators 20 opposed to the one end portions are non-restricted ends which are not fixed to a frame or the like and can be displaced due to a cantilever structure. Further, the first actuators 20 are coupled to end portions of the second actuators 30 at end portions (the non-restricted end portions) of the first actuators 20 opposed to the fixing parts 22. The second actuators 30 are structured to be supported at coupling parts 32 with the first actuators 20, and behave according to cantilever structures including the coupling parts 32 as fixing parts.

Thus, the first actuators 20 and the second actuators 30 are arranged beside the mirror part 12 in parallel. The first actuators 20 and the second actuators 30 are connected to form a tortuous (meander) shape. The cantilevers of the first actuators 20 and the second actuators 30 adjacent to each other are connected in a folding-back manner.

Resonance drive terminals 24 are provided on the first actuators 20. The resonance drive terminals 24 function as electric connection terminals for supplying a driving signal (a driving voltage) to a corresponding first actuator 20. The resonance drive terminal 24 is configured to apply a driving voltage to an upper electrode (see reference sign 48 in FIG. 2) of the first actuator 20. A drive controller (hereinafter, called "first drive controller") 28 is electrically connected to the first actuators 20 via the resonance drive terminals 24. The first drive controller 28 functions as a power supply source for driving the first actuators 20. Incidentally, terminals for electrical connection to a lower electrode (see reference sign 43 in FIG. 2) of the first actuator 20 are omitted from the figures for sake of simplicity of illustration.

The first drive controller 28 includes a driving circuit for supplying a driving voltage for driving the first actuators 20 and an output control circuit of the driving circuit. When a predetermined driving voltage is applied to the resonance drive terminals 24 from the first drive controller 28, the first actuators 20 are driven. The first drive controller 28 corresponds to "outer actuator driving voltage supply part".

The second actuators 30 are coupled to the mirror part 12 at other ends of the second actuators 30 different from the coupling parts 32 with the first actuators 20. Coupling parts (reference sign 33) between the second actuators 30 and the mirror part 12 are provided on one end of the mirror part 12 in the X direction. Both ends of the mirror part 12 in the Y direction are supported by the coupling parts 33 of the pair of the second actuators 30 at one end portion of the mirror part 12 in the X direction.

Terminals for scan center movement 34 are provided on the second actuators 30. The terminals for scan center movement 34 function as electric connection terminals for supplying a signal for drive (a driving voltage) externally. The terminals for scan center movement 34 are configured to apply a driving voltage to the upper electrode (see reference sign 48 in FIG. 2) of the second actuator 30. A drive controller (hereinafter, called "second drive controller") 38 is electrically connected to the second actuators 30 via the terminals for scan center movement 34. The second drive controller 38 functions as a power supply source for driving the second actuators 30. Incidentally, terminals for electrical connection to a lower electrode (see reference sign 43 in FIG. 2) of the second actuator 30 is omitted from the figures for sake of simplicity of illustration.

The second drive controller 38 includes a driving circuit for supplying a driving voltage for driving the second actuator 30 and an output control circuit of the driving circuit. When a predetermined driving voltage is applied to the terminals for scan center movement 34 from the second drive controller 38, the second actuators 30 are driven. The second drive controller 38 corresponds to "inner actuator driving voltage supply part".

The mirror part 12 is coupled to the second actuators 30, and the mirror part 12 can be swung around an axis parallel to the Y axis in response to driving of the first actuators 20 and the second actuators 30. Light (for example, a laser beam emitted from a laser light source (not illustrated)) entering the mirror part 12 is reflected, and an advancing direction of reflected light and an illumination position of the reflected light are changed according to an inclination (an inclination angle) of the mirror part 12. Optical scan (A scan) in the X direction is performed by performing resonance drive of the mirror part 12 by the first actuators 20. Further, the scan center of the resonance-scan can be moved in the X direction by driving of the second actuators 30 (C scan). By driving the first actuators 20 and the second actuators 30 simultaneously, optical scan obtained by combining the A scan and the C scan can be realized.

Figure 2:
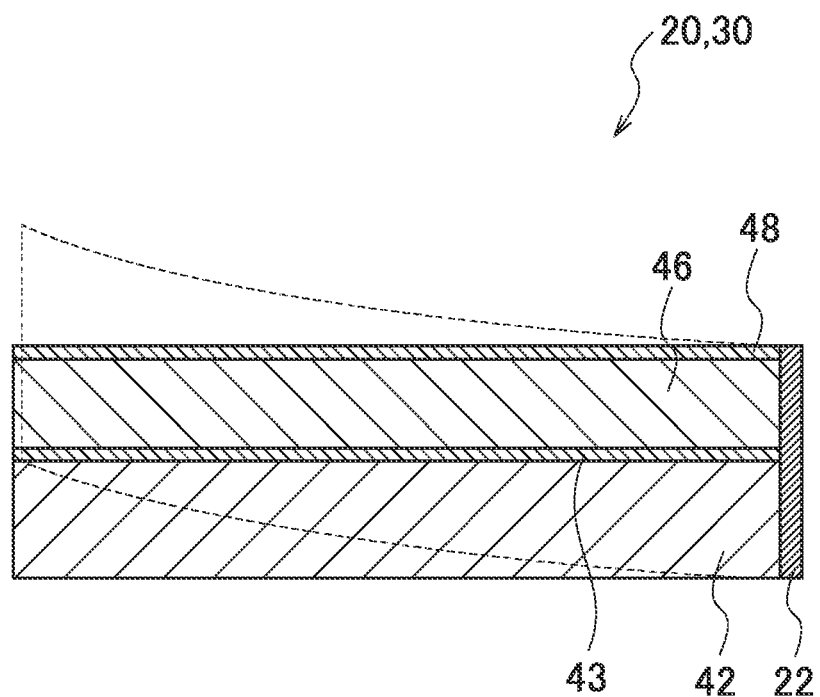
FIG. 2 is a sectional view of a first actuator (a cantilever part)

FIG. 2 is a view illustrating a sectional structure of the first actuator 20 including a piezoelectric unimorph cantilever structure. In FIG. 2, only the first actuator 20 having the fixing part 22 is illustrated, but a configuration of the second actuator 30 is basically similar to that of the first actuator 20. However, in the second actuator 30, the coupling part 32 (see FIG. 1) corresponds to the fixing part (corresponding to reference sign 22 in FIG. 2) of a lever part. Incidentally, a structure other than the unimorph cantilever can be used as the piezoelectric actuator in the subject matter. For example, a bimorph cantilever composed of two layered piezoelectric bodies stacked to sandwich an electrode may be used. For convenience sake of explanation, an example using the piezoelectric unimorph actuator is described.

As illustrated in FIG. 2, each of the first actuator 20 and the second actuator 30 has a structure where a lower electrode 43, a piezoelectric body 46, and an upper electrode 48 are stacked on an oscillation plate 42. Such a stacked structure can be obtained, for example, by forming respective layers of the lower electrode 43, the piezoelectric body 46, and the upper electrode 48 on a silicone (Si) substrate sequentially.

As the piezoelectric body 46 applicable to this embodiment, there are materials containing one or more kinds of perovskite oxides (P) represented by the following formula.

General Formula $ABO_3$ (P)

(In the formula,

A: at least one element which is contained in A site and contains Pb;

B: at least one element which is contained in B site and is at least one element selected from Ti, Zr, V, Nb, Ta, Sb, Cr, Mo, W, Mn, Sc, Co, Cu, In, Sn, Ga, Zn, Cd, Fe, and Ni; and O: oxygen element.

A standard mole ratio of the A site element, the B site element, and the oxygen element is 1:1:3. However, the mole ratio may be deviated from the standard mole ratio within a range where the perovskite structure can be taken.)

As the perovskite-type oxides represented by the above general formula, there are lead-containing compounds such as lead titanate, lead zirconate titanate (PZT), lead zirconate, lead lanthanum titanate, lead lanthanum zirconate titanate, lead magnesium niobate zirconium titanate, lead nickel niobate zirconium titanate, or lead zinc niobate zirconium titanate, and mixed crystals thereof; and non-lead-containing compounds such as barium titanate, strontium barium titanate, bismuth sodium titanate, bismuth potassium titanate, sodium niobate, potassium niobate, lithium niobate, or bismuth ferrite, and mixed crystals thereof.

Further, it is preferred that the piezoelectric body film of this embodiment contains one or more kinds of perovskite oxides (PX) represented by the following formula.

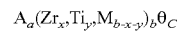

$A_a(Zr_x,Ti_y,M_{b-x-y})_b O_c$ (PX)

(In formula,

A: at least one element which is contained in A site and contains Pb;

M is at least one element selected from V, Nb, Ta, and Sb. $0<x<b$, $0<y<b$, and $0 \leq b-x-y$.

a: b: c=1:1:3 is a standard. However, the mole ratio may be deviated from the standard mole ratio within a range where the perovskite structure can be taken.)

The piezoelectric body film made of the perovskite oxide represented by the above-described general formulae (P) and (PX) has a high piezoelectric strain constant (d31 constant). Thus, a piezoelectric actuator including such a piezoelectric film becomes excellent in displacement characteristic.

The piezoelectric actuator provided with the piezoelectric film made of the perovskite oxide represented by the above-described general formulae (P) and (PX) has a voltage-displacement characteristic excellent in linearity in a driving voltage range. These piezoelectric materials have excellent piezoelectric characteristic in implementation of the presently disclosed subject matter.

A bulk piezoelectric body may be joined to a substrate, but such a configuration is preferred that a piezoelectric thin film is directly formed on a substrate by a vapor-phase growth method, a sol-gel method or the like. Especially, it is preferred that the piezoelectric body 46 in the present embodiment is a thin film with a thickness of 1 to 10 nm. In an example described later, a PZT thin film with a thickness of 4 nm formed by a sputtering method is used, but the presently disclosed subject matter is not limited to this.

In the configuration illustrated in FIG. 2, by applying a voltage between the electrodes (43, 48), the piezoelectric body 46 is deformed. And, the oscillation plate 42 is flexed according to the deformation of the piezoelectric body 46, so that the lever part is moved vertically. A broken line illustrated in FIG. 2 represents an aspect where the lever part has been displaced upward.

Figure 3:
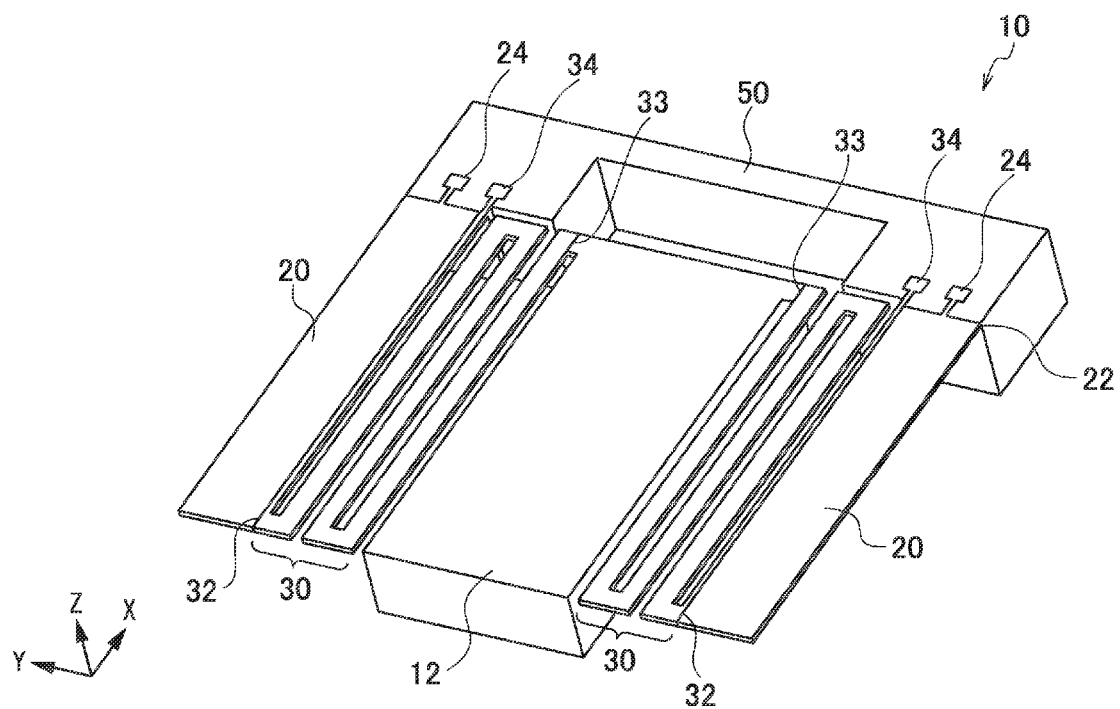
FIG. 3 is a perspective view of a configuration including a supporting member of the MEMS scanner device illustrated in FIG. 1.

FIG. 3 is a perspective view of a configuration including a supporting member 50 connected to the fixing parts 22 of the MEMS scanner device 10 illustrated in FIG. 1. FIG. 3 is a perspective view as viewed in a direction different from the direction illustrating FIG. 1. As illustrated in FIG. 3, the MEMS scanner device 10 includes the supporting member 50 (corresponding to "fixing and supporting member") holding the first actuators 20 in a cantilever structure. The supporting member 50, the first actuators 20, the second actuators 30, and the mirror part 12 can be produced as a structure where the supporting member 50, the first actuators 20, the second actuators 30, and the mirror part 12 have been configured integrally by performing processing from a silicon substrate utilizing a semiconductor fabrication technique.

As apparent from FIG. 3, the thicknesses of the first actuators 20, the second actuators 30, and the coupling parts 32, and 33 are thinner than the thicknesses of the supporting member 50 and the mirror part 12. Thereby, such a structure where each actuator (20, 30) and the coupling parts 32 and 33 are easily deformed (bending deformation or twisting deformation).

EXAMPLE

One Example of a Specific Manufacturing Method

The MEMS scanner device 10 was manufactured in the following manner.

(Step 1) First, a Ti adhesion layer with a thickness of 30 nm and an Ir electrode layer with a thickness of 150 nm were sequentially formed on an SOI (silicon on insulator) substrate of an active layer with a thickness of 20 μm and a handle layer with a thickness of 350 μm, by a sputtering method. The Ti adhesion layer and the Ir electrode layer correspond to the lower electrode 43 illustrated in FIG. 2. Incidentally, a film formation temperature of the electrode was 350° C.

(Step 2) A PZT layer with a thickness of 4 μm was formed on the substrate obtained above using a RF (radio frequency) magnetron sputtering apparatus. A Ferroelectric Film-Forming Sputter Apparatus MPS type manufactured by ULVAC, Inc was used as the RF magnetron sputtering apparatus. Film-forming gas was mixed gas of 97.5% Ar and 2.5% $O_2$, and one having composition of $Pb_{1.3}((Zr_{0.52}Ti_{0.48})_{0.88}Nb_{0.12})O_3$ was used as a target material. A film-forming pressure was 2.2 m Torr, and a film-forming temperature was 450° C.

(Step 3) a Pt/Ti which was an upper electrode was patterned on the substrate obtained above by lift-off process. The MEMS scanner device 10 described in FIG. 1 to FIG. 3 was obtained by processing the substrate obtained above based upon a silicon-working process (dry etching or the like).

In implementation of the subject matter, the presently disclosed subject matter is not limited to the above example. A material of the substrate, an electric material, a piezoelectric material, a film thickness, a film forming condition and the like can be properly selected.

<Regarding Operation of the MEMS Scanner Device 10>

Next, an operation of the MEMS scanner device 10 configured above will be described.

A driving voltage of a sine wave $V_A \sin(2\pi f t)$ of a frequency f is inputted into the first actuators 20 for A scan from the first drive controller 28. Thus, a resonance mode is excited so that the mirror part 12 is inclined. The variable "t" in a sine function representing a voltage waveform expresses time.

Figure 4:
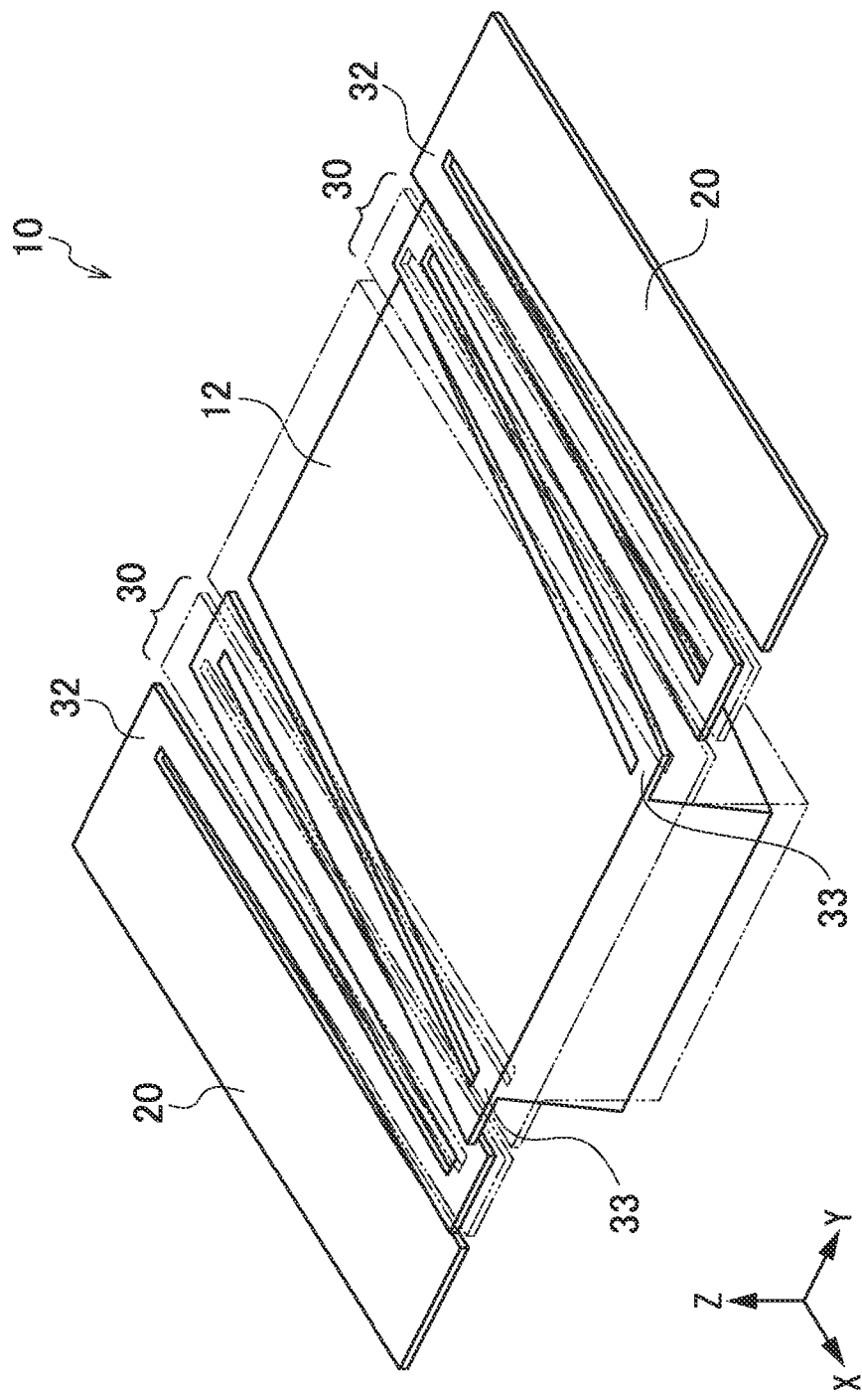
FIG. 4 is a view illustrating an aspect of resonance drive (A scan drive) performed by first actuators.

FIG. 4 is a view illustrating an aspect of resonance drive caused by the first actuators 20. In this embodiment, the resonance frequency f at this time was 464.5 Hz.

When such resonance is excited, the hinge parts (coupling parts 33) together with the second actuators 30 are largely deformed, so that the mirror part 12 is swung around an axis parallel to the Y axis (oscillated in a rotation direction).

Thus, by applying a sine wave of resonance frequency f=464.5 Hz to the first actuators 20 to induce natural oscillation (inherent oscillation), the mirror part 12 is oscillated at a high speed so that one-dimensional optical scan is performed. The optical scan (resonance scan) caused by the resonance corresponds to the A scan. Incidentally, the frequency f of the alternating-current voltage applied to the first actuators 20 is not required to be strictly coincident with a resonance frequency of the structure necessarily. A difference in frequency is allowed within a range where the resonance is excited.

In addition to the oscillation of the A scan, a driving voltage is applied to the second actuators 30 for C scan from the second drive controller 38 separately from the first actuators 20. The driving voltage is composed of a DC (direct-current) voltage and an arbitrary waveform $V_2$, and the driving voltage is adjusted such that resonance is not induced by the driving voltage.

Figure 5:
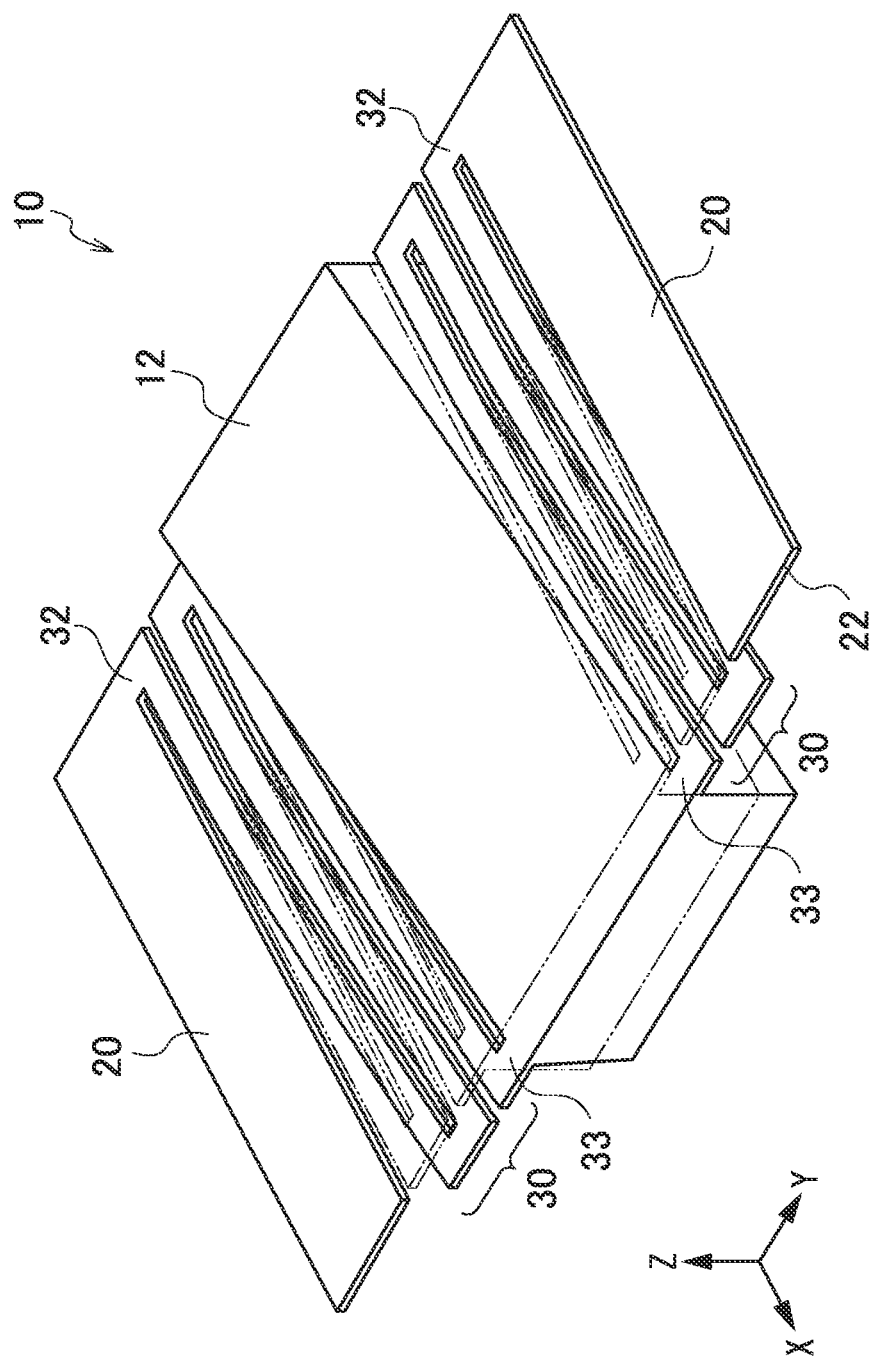
FIG. 5 is a view illustrating an aspect of non-resonance drive (C scan drive) performed by second actuators.

FIG. 5 is a view illustrating an aspect of deformation occurring when a DC voltage has been applied to the second actuators 30. A voltage $V_2$ having an arbitrary waveform is applied to the second actuators 30 in addition to resonance drive caused by the first actuators 20. Then, the second actuators 30 are deformed in response to the voltage $V_2$, as illustrated in FIG. 5, and the mirror part 12 is inclined about an axis parallel to the Y axis according to the deformation of the second actuators 30. While the mirror part 12 is being oscillated at a high speed by the resonance illustrated in FIG. 4, the mirror part 12 is moved so as to incline as a whole, as illustrated in FIG. 5. The scan center of the A scan is moved by the driving of the second actuators 30.

By driving the first actuators 20 and the second actuators 30 simultaneously, while the mirror part 12 performs the A scan, while the scan center of the mirror part 12 can be moved. In this embodiment, the mirror part 12 is swung by two parallel rotation axes which are the rotation axis of the first actuators 20 and the rotation axis of the second actuators 30. Therefore, a scan direction of the A scan and a moving direction of the movement of the scan center caused by the C scan are coincident with each other, so that one-dimensional scan can be obtained by combination of the A scan and the C scan.

Figure 6:
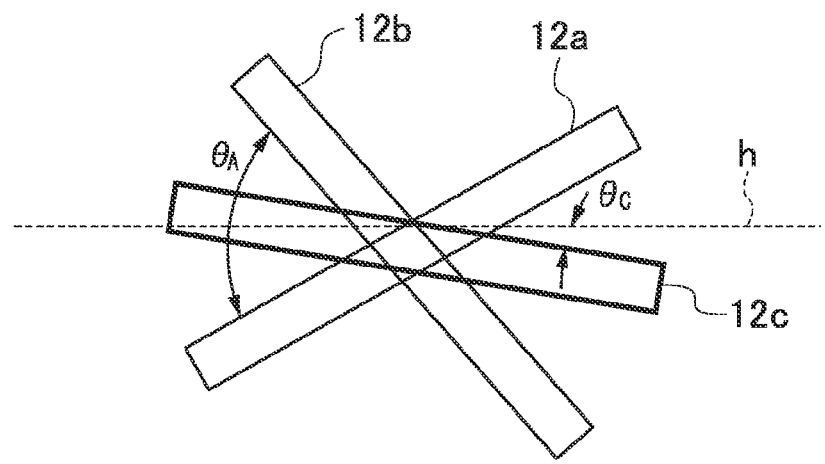
FIG. 6 is a pattern diagram for explaining an operation of a mirror part.

FIG. 6 is a pattern diagram for explaining an operation of the mirror part 12, the diagram is obtained by seeing the mirror part 12 from the Y-axis direction (a direction of the rotation axis). Since the natural oscillation of the mirror part 12 is excited by driving the first actuators 20, the mirror part 12 is oscillated about an axis parallel to the Y axis within a range of an angle (A scan angle) $\theta_A$. Then, the mirror part 12 is swung between a position 12a and a position 12b. A rotation angle between the position 12a and the position 12b which are the maximum displacement positions caused by the oscillation in the rotation direction is defined as $\theta_A$.

Further, in FIG. 6, a position of the reflecting face of the mirror part 12 when the DC voltage is not applied to the second actuators 30 is represented as h, and a position of the mirror part 12 when the DC voltage is applied to the second actuators 30 is represented as reference sign 12c. An inclination angle of the mirror part 12 (C scan angle) at this time is represented as $\theta_C$. By simultaneous driving of the first actuators 20 and the second actuators 30, the mirror part 12 is oscillated about the position $\theta_C$ as an oscillation center within the range of A scan angle $\theta_A$.

Here, the following Table 1 illustrates a relationship among Vc, the angle of A scan $\theta_A$, and the angle of C scan $\theta_C$ obtained when the sine wave of $V_A$=0.5 V and f=456 Hz is inputted to the first actuators 20 and simultaneously the DC voltage "Vc" is inputted into the second actuators 30.

TABLE 1

| | Vc [V] | | | | |
|---|---|---|---|---|---|
| | 10 | 20 | 30 | 40 | 50 |
| A scan angle $\theta_A$ [°] | 15.5 | 15.3 | 15.2 | 15.4 | 15.3 |
| C scan angle $\theta_C$ [°] | 1.1 | 2.0 | 3.4 | 4.2 | 4.7 |

As illustrated in Table 1, the A scan angle $\theta_A$ does not depend on Vc. Further, the C scan angle $\theta_C$ is determined by Vc.

Thus, the sine wave for resonance drive is applied to the first actuators 20, and, at the same time, an arbitrary bias voltage for scan center movement is applied to the second actuators 30. Then, the scan center can be freely moved in the Y direction, while a high speed scan is performed in the y direction.

Figure 7A:
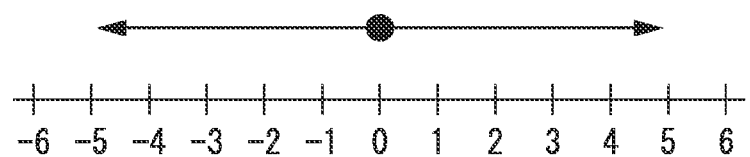
FIG. 7A is a diagram illustrating a scan range of light reflected by the mirror part.
Figure 7B:
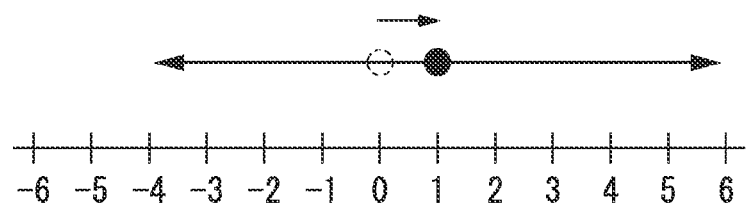
FIG. 7B is a diagram illustrating an aspect of movement of a scan center.

For example, it is considered that, when no voltage is applied to the second actuators 30, as illustrated in FIG. 7A, reflected light is scanned from the center of the origin O within a range from −5 to +5 by oscillation of the mirror part 12 caused by the first actuator 20. It is assumed that, by applying the DC voltage (for example, 2V) to the second actuators 30 simultaneously with the resonance scan (the A scan), thereby inclining the whole mirror part 12, the scan center is moved from the origin O to +1. Then, the scan range of the reflected light performed by the first actuators 20 is changed to a range from −4 to +6.

Modified Embodiment 1

In the above-described embodiment, the outer actuator parts are used for resonance drive, and the inner actuator parts are used for non-resonance drive (for movement of the scan center). The subject matter is not limited to the above-described embodiment. For example, the inner actuator parts can be used for resonance drive and the outer actuator parts can be used for non-resonance drive.

In this example, the connection order of the first actuators 20 and the second actuators 30 described in FIG. 1 to FIG. 6 may be reversed. For example, one ends of the second actuators for C scan (the outer actuator parts) can be fixed to the supporting member 50, and the second actuators can be connected to the first actuators for A scan (the inner actuator parts) at the other ends of the second actuators opposed to the one ends. And, the first actuators can be further connected to the mirror part 12 at one ends of the first actuators opposed to the second actuators.

Modified Embodiment 2

In the first embodiment described in FIG. 1 to FIG. 7B, the piezoelectric cantilever having the meander folding-back structure is adopted as the second actuator corresponding to the inner actuator part. However, in implementation of the subject matter, whether or not the folding-back structure of the lever part is adopted and the number of times of folding-back (the number of times of folding) are not limited to specific ones. Further, it is also possible to adopt the folding-back structure in the outer actuator part.

The number of times of folding-back of the cantilever, the width of the lever part, or the like affects a whole resonance frequency. As the number of times of folding-back is larger, the resonance frequency becomes lower. Further, the width of the lever part is made thinner, the resonance frequency becomes lower. A desired resonance frequency can be realized by designing the number of times of folding-back, the width of the lever part, or the like properly.

Modified Embodiment 3

Further, a plate-like hinge (see reference sign 73 in FIG. 8) having a folding-back structure promoting deformation can be provided at least one connection point (coupling part) of a connection point between the first actuator 20 and the second actuator 30, and a connection point between the second actuation point 30 and the mirror part 12.

Second Embodiment

Figure 9:
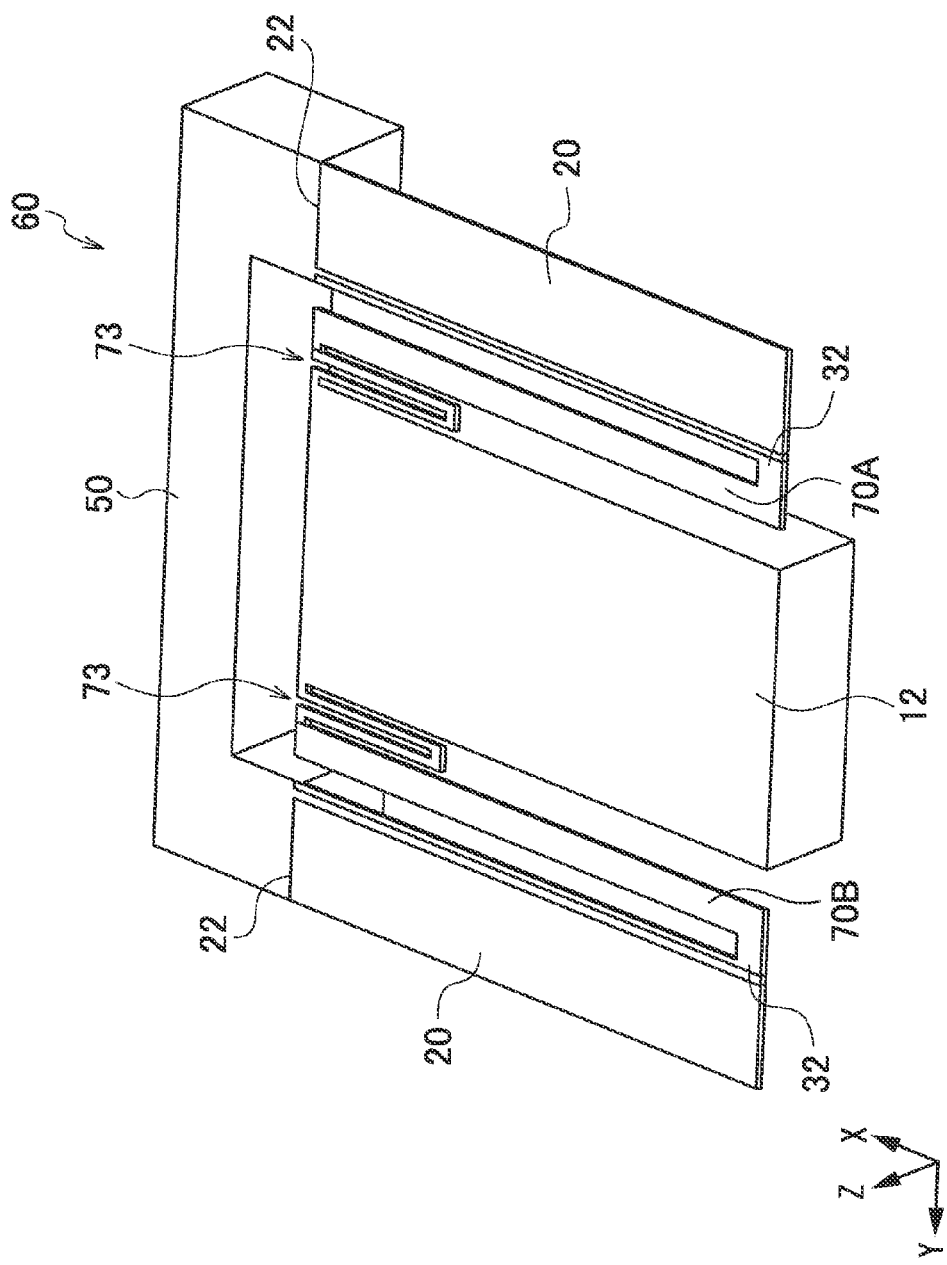
FIG. 9 is a perspective view of a configuration including a supporting member of the MEMS scanner device illustrated in FIG. 8.

FIG. 8 and FIG. 9 are schematic views of an MEMS scanner device and a drive controller for the MEMS scanner device according to a second embodiment. In FIG. 8 and FIG. 9, elements identical with or similar to the configurations of the first embodiment described in FIG. 1 to FIG. 7B are attached with same reference signs and explanation of the elements is omitted. Incidentally, FIG. 9 is a perspective view as viewed in a direction different from the direction illustrating FIG. 8. Further, respective terminals illustrated by reference signs 24, 34A, and 34B in FIG. 8 are omitted from FIG. 9.

An MEMS scanner device 60 according to the second embodiment illustrated in FIG. 8 and FIG. 9 makes two-dimensional scan composed of the A scan and the B scan possible. A manufacturing method of this MEMS scanner device 60 is similar to that of the MEMS scanner device 10 of the first embodiment.

The MEMS scanner device 60 according to the second embodiment induces oscillation of the mirror part 12 about an axis parallel to the Y axis (a rotation axis) by performing resonance drive of the first actuators 20 corresponding to the outer actuator parts. A rotation motion of the mirror part 12 about an axis parallel to the X axis (a rotation axis) is generated by driving the second actuators 70A and 70B corresponding to the inner actuator parts in directions reverse to each other. The rotation axis (Y axis) of the mirror part 12 due to the resonance drive of the first actuators 20 and the rotation axis (Y axis) of the mirror part 12 due to the drives of the second actuators 70A and 70B are perpendicular to each other. By driving the first actuators 20 and the second actuators 70A and 70B simultaneously, the two-dimensional scan composed of the A scan caused by the drive of the first actuators 20 and the B scan caused by the drives of the second actuators 70A and 70B which have been combined to each other can be realized.

In this embodiment, in order to apply different driving voltages (voltages having polarities reversed to each other) to the pair of second actuators 70A and 70B arranged on both sides of the mirror part 12 so as to sandwich the mirror part 12, drive controllers 38A and 38B are provided corresponding to the respective actuators 70A and 70B. A drive controller (hereinafter, called "third drive controller") 38A is a power supply source for driving the second actuator 70A, and is connected to a terminal for scan center movement 34A for applying a driving voltage to one second actuator 70A.

Similarly, a drive controller (hereinafter, called "fourth drive controller") 38B is a power supply source for driving the second actuator 70B, and is connected to a terminal for scan center movement 34B for applying a driving voltage to the other second actuator 70B. Incidentally, terminals for electrical connections to the lower electrodes (see reference sign 43 in FIG. 2) of the respective second actuators 70A and 70B is omitted from the figures for sake of simplicity of illustration. Further, in FIG. 9, the resonance drive terminals 24, and the terminals for scan center movement 34A and 34B is also omitted. The combination of the third drive controller 38A and the fourth drive controller 38B corresponds to "inner actuator driving voltage supply part").

Plate-like coupling parts (hereinafter, called "plate-like hinge") 73 having a folding-back structure are adopted in the coupling parts between the second actuators 70A and 70B, and the mirror part 12. Such a plate-like hinge 73 having a folding-back structure is easily deformed and has an effect of increasing a displacement amount of the connection point. The plate-like hinge 73 can also be similarly formed integrally with the mirror part 12 or the like by processing silicon.

A sine wave $V_A \sin(2\pi f_A t)$ with a frequency $f_A$ is inputted into the first actuators 20 for A scan from the first drive controller 28, and such a resonance mode that the mirror part 12 inclines is excited.

Figure 10:
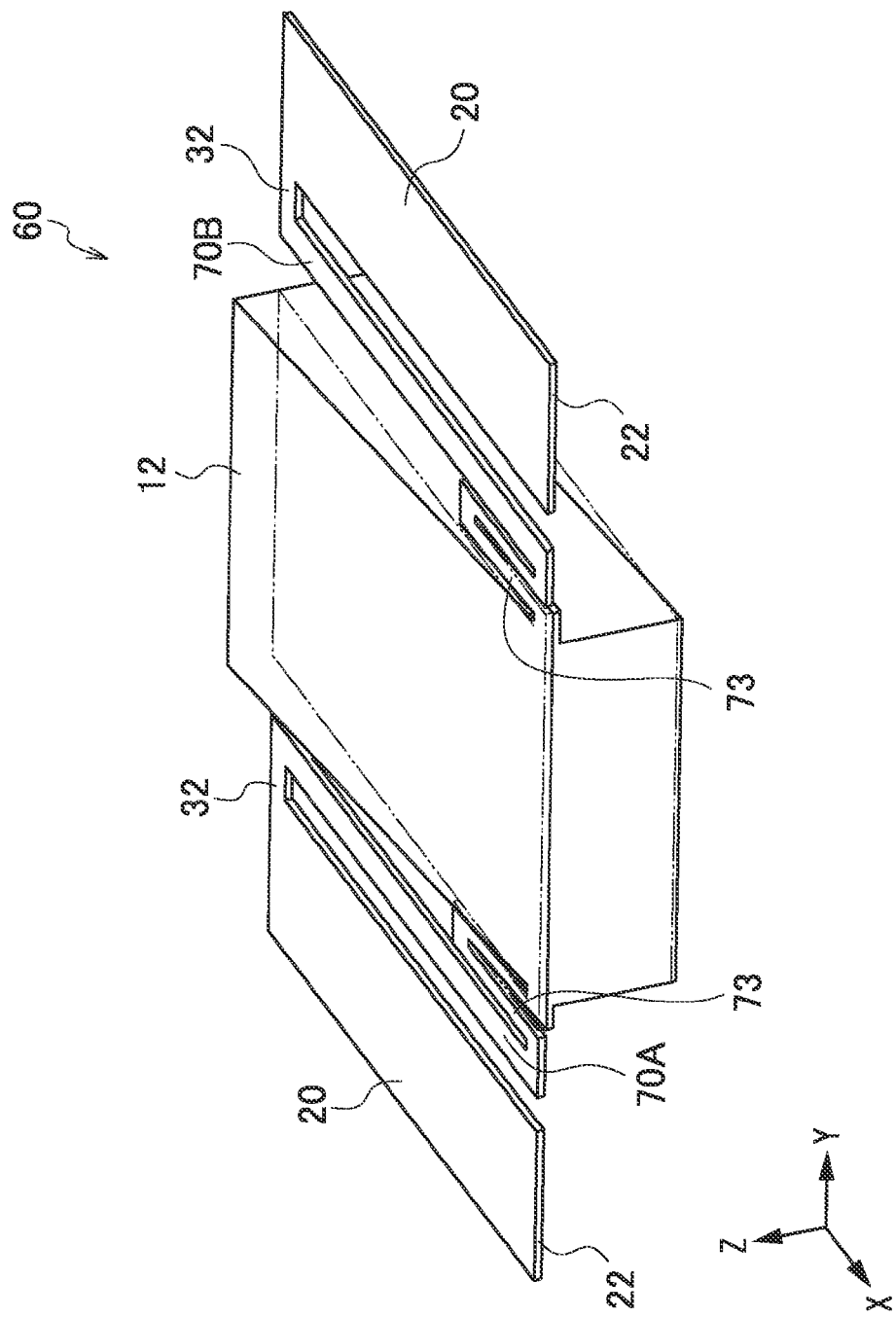
FIG. 10 is a view illustrating an aspect of resonance drive performed by first actuators illustrated in FIG. 8.

FIG. 10 is a view illustrating an aspect of resonance drive performed by the first actuators 20 of the MEMS scanner device 60. In the second embodiment, the resonance frequency f was 258 Hz. By exciting such resonance, the hinge parts (coupling parts) are largely deformed, and the mirror part 12 is swung as about an axis parallel to the Y axis (rotation axis).

Figure 11:
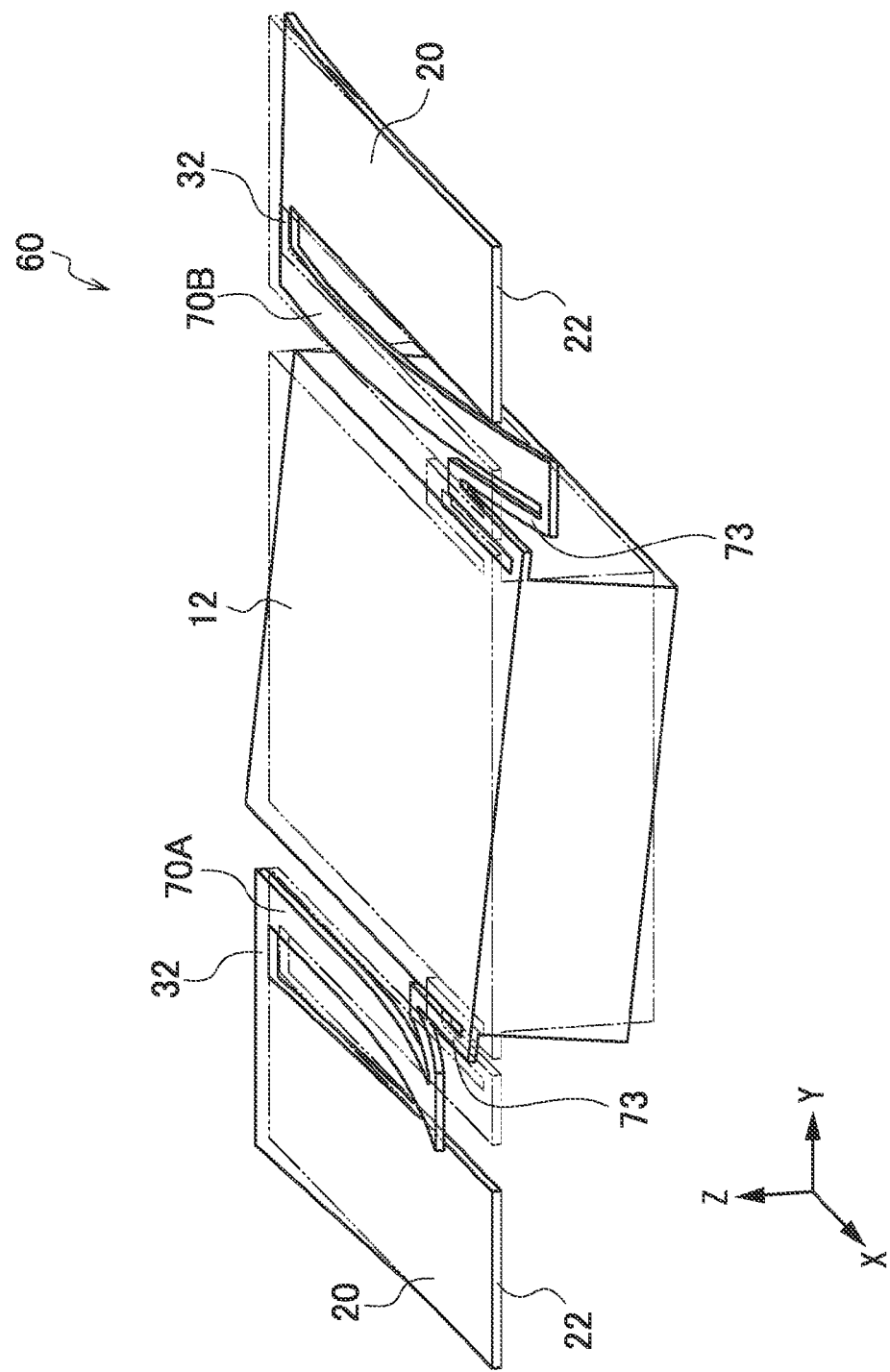
FIG. 11 is a view illustrating an aspect of deformation (at a time of static drive) when a DC voltage is applied to second actuators illustrated in FIG. 8.
Figure 12:
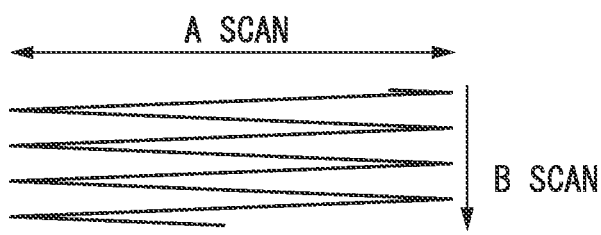
FIG. 12 is an explanatory diagram of A scan and B scan.
Figure 13:
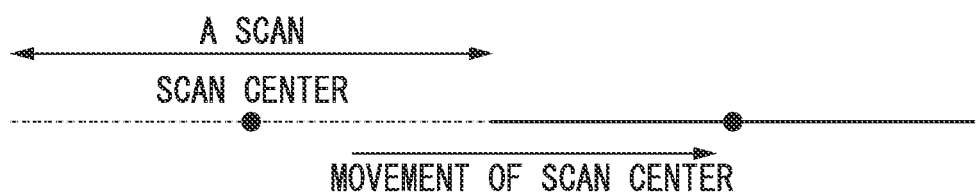
FIG. 13 is an explanatory diagram of an example of moving a scan center of the A scan.

Voltages $V_2$ different from each other are applied to the second actuators 70A and 70B for B scan. For example, when bias voltages $\pm V_B$ in directions opposed to each other are applied to the second actuators 70A and 70B, the mirror part 12 is inclined around an axis parallel to the Y axis (rotation axis), as illustrated in FIG. 11. Thereby, the scan center of the A scan can be moved in a direction perpendicular to the direction of the A scan.

Further, instead of the configuration where bias voltages in directions opposed to each other are applied to the second actuators 70A and 70B, when alternating-current waveforms $\pm V_B \sin(2\pi f_B t)$ having opposite phases are applied to the second actuators 70A and 70B, the mirror part 12 is swung at a high speed about the Y axis which serves as the rotation axis. However, it is assumed that the frequency $f_B$ is a frequency which does not induce resonance. With such a configuration, the mirror part 12 is swung in the X-axis direction by the first actuators 20 and is swung in the Y-axis direction by the second actuators 70A and 70B. Thereby, two-dimensional scan in the X-axis direction and in the Y-axis direction can be made possible.

Incidentally, the resonance frequency in the second embodiment is lower than the resonance frequency in the first embodiment due to influence of the plate-like hinges 73 in the second embodiment. As illustrated in FIG. 8 to FIG. 11, the plate-like hinge 73 is smaller than each of the second actuators 70A and 70B, and has a slender meander-like foldingback structure. The plate-like hinge 73 (meander part) becomes flexible like a spring, thereby providing an effect of increasing the inclination (displacement) of the mirror part 12 and simultaneously lowering the resonance frequency. A desired resonance frequency can be designed based upon the number of times of folding-back, the slenderness, and the plate thickness of the plate-like hinge 73, and the like.

Modified Embodiment 4

In FIG. 8, the third drive controller 38A and the fourth drive controller 38B are provided separately from each other in the embodiment. However, a plurality of driving voltages can be outputted from one drive controller. Further, in the first embodiment and the second embodiment, the drive controller (28, 38, 38A, 38B) for each actuator (20, 30, 70A, 70B) has been provided. However, it is unnecessary to configure the driving voltage supply source and the controller for the diving voltage supply source integrally. For example, a similar system can be configured using a driving voltage supply source outputting a driving voltage for resonance drive (for A scan), a driving voltage supply source(s) outputting a driving voltage for non-resonance drive (for B scan or for C scan), and one controller for controlling these driving voltage supply sources.

<One Example of Device Size>

The size and the specific shape of each of the MEMS scanner devices 10 and 60 manufactured as the embodiments of the presently disclosed subject matter can take various aspect. As one example, the size of the device including the mirror part 12, the pair of second actuators 30, the pair of first actuators 20, and the supporting member 50 is about 3 mm×2 mm or so. Further size reduction is also possible and a device having a size of about 1 mm×1 mm or so can be manufactured.

<Advantageous Effect Obtained by the Embodiments of the Presently Disclosed Subject Matter>

(1) A piezoelectric micro-mirror device which allows movement of a scan center and two-dimensional scan can be provided without using a complicated structure such as a movable frame which has been conventionally known.

(2) Higher durability is obtained than the configuration where a driving waveform for A scan resonance (sine wave) and a driving waveform for B scan or C scan are applied to the same actuator in a superimposing manner.

(3) Since the plate-like hinge is adopted in the connection part, and the driving method using bending of the hinge is adopted, a larger displacement amount can be obtained. That is, a large deflection angle can be obtained.

(4) The frequency for A scan can be controlled by the number of times of folding-back. When the number of times of folding-back is decreased, the resonance frequency is raised, so that a further high-speed scan is made possible.

(5) The supporting member, each actuator part, the mirror part, and connection parts for the supporting member, the actuator part, and the mirror part can be formed integrally by silicon processing.

(6) Further size reduction can be made as compared with a conventional polygon mirror or a galvanometer mirror, and higher durability can also be obtained.

Application Examples

The presently disclosed subject matter can be utilized in various applications as an optical device for reflecting light such as a laser beam to change an advancing direction of the light. The presently disclosed subject matter can be widely applied to, for example, an optical deflector, an optical scanner, a laser printer, a barcode reader, a display device, various optical sensors (a ranging sensor, a shape-measuring sensor), an optical communication device, and the like.

Incidentally, the presently disclosed subject matter is not limited to the embodiments described above. The presently disclosed subject matter can be modified variously within the technical idea of the subject matter.

<Additional Description: Aspects of the Presently Disclosed Subject Matter>

As described in the embodiments of the presently disclosed subject matter, this specification discloses various technical ideas including the subject matter at least described below.
(Aspect 1):

A mirror driving device of aspect 1 can include: a mirror part; a pair of inner actuator parts which are arranged on both sides of the mirror part so as to sandwich the mirror part, and is coupled to the mirror part, the pair of inner actuator parts configured to perform bending displacement due to deformation of a piezoelectric body; a pair of outer actuator parts which are arranged on both sides of the mirror part, are arranged at positions farther from the mirror part than the pair of inner actuator parts, and are coupled to the inner actuator parts, the pair of outer actuator parts configured to perform bending displacement due to deformation of a piezoelectric body; fixing and supporting parts which are coupled to end portions of the outer actuator parts other than coupling parts of the outer actuator parts with the inner actuator parts, the fixing and supporting parts configured to support the outer actuator parts by fixing the outer actuator parts at the end portions; an inner actuator driving voltage supply part configured to supply driving voltage to the inner actuator parts to actuate the inner actuator parts; and an outer actuator driving voltage supply part configured to supply driving voltage to the outer actuator parts to actuate the outer actuator parts, wherein one ends of the inner actuator parts are coupled to the mirror part, and the other ends of the inner actuator parts are coupled to the outer actuator parts, a driving voltage with a frequency for inducing oscillation of the mirror part in a rotating direction of the mirror part associated with resonance drive of the corresponding actuator parts is supplied from one driving voltage supply part of the inner actuator driving voltage supply part and the outer actuator driving voltage supply part to the inner actuator parts or the outer actuator parts corresponding to the one driving voltage supply part, and, simultaneously with the resonance drive, a driving voltage for inclining the mirror part without exciting resonance drive is supplied from the other driving voltage supply part to corresponding actuator parts different from the actuator parts performing the resonance drive of the inner actuator parts and the outer actuator parts.

According to the aspect 1, the pair of outer actuator parts are arranged at further outer positions of a pair of inner actuator parts arranged so as to sandwich a mirror part from both sides of the mirror part. The pair of outer actuator parts are arranged so as to sandwich the pair of inner actuator parts from both sides of the inner actuator parts. The mirror part is supported by coupling parts of the mirror parts with the inner actuator parts coupled to both sides of the mirror part.

Each actuator part includes a piezoelectric actuator configured to perform bending displacement by deformation of a piezoelectric body thereof. In the configuration, the actuator part configured to perform resonance drive and the actuator part configured to perform non-resonance drive are divided from each other, and applications of driving voltages are performed to the respective actuator parts individually. The outer actuator parts can be used for resonance drive, and the inner actuator parts can be used for non-resonance drive. The inner actuator parts can be used for resonance drive, and the outer actuator parts can be used for non-resonance drive. A DC voltage can be applied as the driving voltage for non-resonance drive, and application of an alternating-current voltage with a frequency which does not excite resonance can be performed.

According to the aspect 1, resonance scan can be performed by movement of the mirror due to resonance drive. And, the scan center of the resonance scan can be moved by movement of the mirror part due to non-resonance drive.

Further, the aspect 1 has a structure simpler than the structure using a conventional movable frame (Japanese Patent No. 4092283). Further, the aspect 1 can suppress a driving voltage applied to each actuator part to be lower and can have durability higher than the configuration where an alternating-current voltage for resonance drive and an offset bias are applied to the same actuator part in a superimposing manner.
(Aspect 2):

In the mirror driving device described in the aspect 1, each of the outer actuator parts can have a cantilever structure in which the outer actuator parts are fixed at coupling parts with the fixing and supporting parts, and each of the inner actuator parts can have a cantilever structure in which the inner actuator parts are fixed at the coupling part with the outer actuator part.

According to the aspect 2, the outer actuator part functions as a piezoelectric cantilever displaced as a fulcrum of the coupling part (supporting part) with the fixing and supporting part. The inner actuator part functions as a piezoelectric cantilever displace as a fulcrum of the coupling part with the outer actuator.
(Aspect 3):

In the mirror driving device described in the aspect 1 or 2, each of the outer actuator parts and the inner actuator parts can be an actuator of a piezoelectric unimorph-type having a structure where a lower electrode, a piezoelectric body, and an upper electrode are stacked on an oscillation plate in this order.

The piezoelectric unimorph-type actuator has a simple structure. Therefore, the piezoelectric unimorph-type actuator can be easily manufactured.
(Aspect 4):

In the mirror driving device described in any one of the aspects 1 to 3, driving can be performed such that a rotation axis of a rotation motion of the mirror part caused by driving of the inner actuator parts becomes parallel with a rotation axis of a rotation motion of the mirror part caused by driving of the outer actuator parts.

According to the aspect 4, a one-dimensional scan (optical scan) where an optical scanning direction for A scan (resonance scan) coincides with a direction of C scan (movement of the scan center) can be made.

(Aspect 5):

In the mirror driving device described in any one of the aspects 1 to 3, driving can be performed such that a rotation axis of a rotation motion of the mirror part caused by driving of the inner actuator parts becomes perpendicular to a rotation axis of a rotation motion of the mirror part caused by driving of the outer actuator parts.

According to the aspect 5, the scan center can be moved in a direction perpendicular to the optical scanning direction of the A scan (resonance scan), so that a two-dimensional scan can be made possible.

(Aspect 6):

In the mirror driving device described in any one of the aspects 1 to 5, a folding-back structure promoting deformation of the at least one can be adopted in at least one of each of the coupling parts between the mirror part and the inner actuator parts and each of the coupling parts between the inner actuator parts and the outer actuator parts.

According to the aspect 6, the displacement amount of the coupling part can be made larger.

(Aspect 7):

In the mirror driving device described in any one of the aspects 1 to 6, the piezoelectric body can be a thin film having a thickness of 1 to 10 μm.

It is preferred that the piezoelectric actuator is constituted using a thin film piezoelectric body.

(Aspect 8):

In the mirror driving device described in any one of the aspects 1 to 7, the piezoelectric body can be one or more kinds of perovskite oxides represented by a following formula (P):

$$\text{General Formula ABO}_3 \tag{P}$$

in the formula, A: at least one element which is contained in A site and contains Pb, B: at least one element which is contained in B site and is at least one element of Ti, Zr, V, Nb, Ta, Sb, Cr, Mo, W, Mn, Sc, Co, Cu, In, Sn, Ga, Zn, Cd, Fe and Ni, and O: oxygen. Here, a standard mole ratio of the A site element, the B site element, and the oxygen element is 1:1:3. The mole ratio may be deviated from the standard mole ratio within a range where the perovskite structure can be taken.

Such a piezoelectric body has an excellent piezoelectric characteristic and the piezoelectric body is desirable as the piezoelectric actuator of the presently disclosed subject matter.

(Aspect 9):

In the mirror driving device described in any one of the aspects 1 to 8, the piezoelectric body can be one or more kinds of perovskite oxides represented by a following formula (PX), $$A_a(Zr_x, Ti_y, M_{b-x-y})_b O_C \tag{PX}$$

in formula, A: at least one element which is contained in A site and contains Pb, M is at least one element of V, Nb, Ta and Sb, and 0<x<b, 0<y<b, and 0≤b−x−y. Here, a:b:c=1:1:3 is a standard. The mole ratio may be deviated from the standard mole ratio within a range where the perovskite structure can be taken.

Such a piezoelectric body has an excellent piezoelectric characteristic and the piezoelectric body is desirable as the piezoelectric actuator of the presently disclosed subject matter.

(Aspect 10):

In the mirror driving device described in any one of the aspects 7 to 9, the piezoelectric body can be a thin film formed directly on a substrate constituting the oscillation plate.

As the direct film-forming method, a vapor-phase growth method such as a sputtering method, a sol-gel method, or the like can be used. Thereby, a piezoelectric thin film having a desired performance can be obtained.

(Aspect 11):

In the mirror driving device described in the aspect 10, the piezoelectric body can be a thin film formed by a sputtering method.

(Aspect 12):

An aspect 12 relates to a mirror driving method for controlling a mirror driving device. The mirror driving device includes: a mirror part; a pair of inner actuator parts which are arranged on both sides of the mirror part so as to sandwich the mirror part, and is coupled to the mirror part, the pair of inner actuator parts configured to perform bending displacement due to deformation of a piezoelectric body; a pair of outer actuator parts which are arranged on both sides of the mirror part, are arranged at positions farther from the mirror part than the pair of inner actuator parts, and are coupled to the inner actuator parts, the pair of outer actuator parts configured to perform bending displacement due to deformation of a piezoelectric body; and fixing and supporting parts which are coupled to end portions of the outer actuator parts other than coupling parts of the outer actuator parts with the inner actuator parts, the fixing and supporting parts configured to support the outer actuator parts by fixing the outer actuator parts at the end portions, wherein one ends of the inner actuator parts are coupled to the mirror part, and the other ends of the inner actuator parts are coupled to the outer actuator parts. The method can include the steps of: preparing an inner actuator driving voltage supply part configured to supply driving voltage to the inner actuator parts to actuate the inner actuator parts, and an outer actuator driving voltage supply part configured to supply driving voltage to the outer actuator parts to actuate the outer actuator parts separately from each other; supplying a driving voltage with a frequency inducing oscillation of the mirror part in a rotating direction of the mirror part associated with resonance drive of the corresponding actuator parts from one driving voltage supply part of the inner actuator driving voltage supply part and the outer actuator driving voltage supply part to the inner actuator parts or the outer actuator parts corresponding to the one driving voltage supply part; and simultaneously with the resonance drive, supplying a driving voltage for inclining the mirror part without exciting resonance drive from the other driving voltage supply part to corresponding actuator parts different from the actuator parts performing the resonance drive of the inner actuator parts and the outer actuator parts.

What is claimed is:

1. A mirror driving device comprising:
   a mirror part;
   a pair of inner actuator parts which are arranged on both sides of the mirror part so as to sandwich the mirror part, and is coupled to the mirror part, the pair of inner actuator parts configured to perform bending displacement due to deformation of a piezoelectric body;
   a pair of outer actuator parts which are arranged on both sides of the mirror part, are arranged at positions farther from the mirror part than the pair of inner actuator parts, and are coupled to the inner actuator parts, the pair of outer actuator parts configured to perform bending displacement due to deformation of a piezoelectric body;
   fixing and supporting parts which are coupled to end portions of the outer actuator parts other than coupling parts of the outer actuator parts with the inner actuator parts, the fixing and supporting parts configured to support the outer actuator parts by fixing the outer actuator parts at the end portions;

an inner actuator driving voltage supply part configured to supply driving voltage to the inner actuator parts to actuate the inner actuator parts; and an outer actuator driving voltage supply part configured to supply driving voltage to the outer actuator parts to actuate the outer actuator parts, wherein one ends of the inner actuator parts are coupled to the mirror part, and the other ends of the inner actuator parts are coupled to the outer actuator parts, a driving voltage with a frequency for inducing oscillation of the mirror part in a rotating direction of the mirror part associated with resonance drive of the corresponding actuator parts is supplied from one driving voltage supply part of the inner actuator driving voltage supply part and the outer actuator driving voltage supply part to the inner actuator parts or the outer actuator parts corresponding to the one driving voltage supply part, and, simultaneously with the resonance drive, a driving voltage for inclining the mirror part without exciting resonance drive is supplied from the other driving voltage supply part to corresponding actuator parts different from the actuator parts performing the resonance drive of the inner actuator parts and the outer actuator parts.

2. The mirror driving device according to claim 1, wherein
each of the outer actuator parts has a cantilever structure in which the outer actuator parts are fixed at coupling parts with the fixing and supporting parts, and
each of the inner actuator parts has a cantilever structure in which the inner actuator parts are fixed at the coupling part with the outer actuator part.

3. The mirror driving device according to claim 1, wherein
each of the outer actuator parts and the inner actuator parts is an actuator of a piezoelectric unimorph-type having a structure where a lower electrode, a piezoelectric body, and an upper electrode are stacked on an oscillation plate in this order.

4. The mirror driving device according to claim 1, wherein
driving is performed such that a rotation axis of a rotation motion of the mirror part caused by driving of the inner actuator parts becomes parallel with a rotation axis of a rotation motion of the mirror part caused by driving of the outer actuator parts.

5. The mirror driving device according to claim 1, wherein
driving is performed such that a rotation axis of a rotation motion of the mirror part caused by driving of the inner actuator parts becomes perpendicular to a rotation axis of a rotation motion of the mirror part caused by driving of the outer actuator parts.

6. The mirror driving device according to claim 1, wherein
a folding-back structure promoting deformation of the at least one is adopted in at least one of each of the coupling parts between the mirror part and the inner actuator parts and each of the coupling parts between the inner actuator parts and the outer actuator parts.

7. The mirror driving device according to claim 1, wherein the piezoelectric body is a thin film having a thickness of 1 to 10 μm.

8. The mirror driving device according to claim 7, wherein the piezoelectric body is a thin film formed directly on a substrate constituting the oscillation plate.

9. The mirror driving device according claim 8, wherein the piezoelectric body is a thin film formed by a sputtering method.

10. The mirror driving device according to claim 1, wherein
the piezoelectric body is one or more kinds of perovskite oxides represented by a following formula (P):

$$\text{General Formula } ABO_3 \tag{P}$$

in the formula,
A: at least one element which is contained in A site and contains Pb,
B: at least one element which is contained in B site and is at least one element of Ti, Zr, V, Nb, Ta, Sb, Cr, Mo, W, Mn, Sc, Co, Cu, In, Sn, Ga, Zn, Cd, Fe and Ni, and
O: oxygen.

11. The mirror driving device according to claim 1, wherein
the piezoelectric body is one or more kinds of perovskite oxides represented by a following formula (PX), $$A_a(Zr_x, Ti_y, M_{b-x-y})_b O_C \tag{PX}$$

in formula,
A: at least one element which is contained in A site and contains Pb,
M is at least one element of V, Nb, Ta and Sb, and
$0<x<b$, $0<y<b$, and $0 \le b-x-y$.

12. A mirror driving method for controlling a mirror driving device, the mirror driving device comprising:
a mirror part;
a pair of inner actuator parts which are arranged on both sides of the mirror part so as to sandwich the mirror part, and is coupled to the mirror part, the pair of inner actuator parts configured to perform bending displacement due to deformation of a piezoelectric body;
a pair of outer actuator parts which are arranged on both sides of the mirror part, are arranged at positions farther from the mirror part than the pair of inner actuator parts, and are coupled to the inner actuator parts, the pair of outer actuator parts configured to perform bending displacement due to deformation of a piezoelectric body; and
fixing and supporting parts which are coupled to end portions of the outer actuator parts other than coupling parts of the outer actuator parts with the inner actuator parts, the fixing and supporting parts configured to support the outer actuator parts by fixing the outer actuator parts at the end portions, wherein
one ends of the inner actuator parts are coupled to the mirror part, and the other ends of the inner actuator parts are coupled to the outer actuator parts,
the method comprising the steps of:
preparing an inner actuator driving voltage supply part configured to supply driving voltage to the inner actuator parts to actuate the inner actuator parts, and an outer actuator driving voltage supply part configured to supply driving voltage to the outer actuator parts to actuate the outer actuator parts separately from each other;
supplying a driving voltage with a frequency inducing oscillation of the mirror part in a rotating direction of the mirror part associated with resonance drive of the corresponding actuator parts from one driving voltage supply part of the inner actuator driving voltage supply part and the outer actuator driving voltage supply part to the inner actuator parts or the outer actuator parts corresponding to the one driving voltage supply part; and
simultaneously with the resonance drive, supplying a driving voltage for inclining the mirror part without exciting resonance drive from the other driving voltage supply part to corresponding actuator parts different from the actuator parts performing the resonance drive of the inner actuator parts and the outer actuator parts.

* * * * *